US012796656B2

(12) United States Patent
Rachmaninoff et al.

(10) Patent No.: US 12,796,656 B2
(45) Date of Patent: Nov. 17, 2026

(54) ANIMAL HANDLING DEVICE AND SAFETY RELEASE

(71) Applicants: Vanessa T. Rachmaninoff, Nashville, TN (US); James Ronald Lawson, Jr., Franklin, TN (US); Gregory S. Patterson, Raleigh, NC (US); David A. Clemens, Chapel Hill, NC (US); Nathan T. Maher, Durham, NC (US)

(72) Inventors: Vanessa T. Rachmaninoff, Nashville, TN (US); James Ronald Lawson, Jr., Franklin, TN (US); Gregory S. Patterson, Raleigh, NC (US); David A. Clemens, Chapel Hill, NC (US); Nathan T. Maher, Durham, NC (US)

(73) Assignee: Equine Technology Solutions, LLC, Franklin, TN (US)

( * ) Notice: Subject to any disclaimer, the term of this patent is extended or adjusted under 35 U.S.C. 154(b) by 0 days.

(21) Appl. No.: 18/817,773

(22) Filed: Aug. 28, 2024

(65) Prior Publication Data

US 2025/0072396 A1 Mar. 6, 2025

Related U.S. Application Data

(60) Provisional application No. 63/580,121, filed on Sep. 1, 2023.

(51) Int. Cl.
*A01K 13/00* (2006.01)

(52) U.S. Cl.
CPC .................................... *A01K 13/00* (2013.01)

(58) Field of Classification Search
CPC .... A01K 13/00; A01K 13/006; A01K 13/007; A01K 29/00; A01K 27/005; A61D 99/00;
(Continued)

(56) References Cited

U.S. PATENT DOCUMENTS 73,060 A 1/1868 Volkmar
216,705 A 6/1879 Smith
(Continued)

FOREIGN PATENT DOCUMENTS

CN 203506917 U 4/2014
CN 207605130 U 7/2018
(Continued)

OTHER PUBLICATIONS

Machine Translation of WO-2015185873-A1, Bensoussan Erik, Dec. 10, 2015 (Year: 2015).*
(Continued)

*Primary Examiner* — Kimberly S Berona
*Assistant Examiner* — Katherine June Walter
(74) *Attorney, Agent, or Firm* — Schlitter Law Office LLC; Stanley Allen Schlitter

(57) ABSTRACT

The present invention is an animal handling device for aiding a trainer, veterinarian, or other person in moving, stretching, or assessing the range of motion of a leg or other limb of horses, cattle, or other animals. Because of the size and strength of such animals, stretching or moving a limb can be dangerous to the person applying force to the limb in the event the animal makes a sudden movement. The handling device incorporates a safety release to separate a portion engaged with an animal from a portion engaged with a person using the device. The movement of animals is restrained by a strap(s) having a safety release mechanism. Such latter uses of the safety release mechanism also include, for example, lunge lines, cross ties, halters, trailer ties, leashes, and dog restraints for owners, groomers, or veterinarians.

20 Claims, 10 Drawing Sheets

(58) Field of Classification Search
CPC ...... A64D 9/00; A63B 21/0557; A63B 21/28; A63B 21/285
See application file for complete search history.

(56) References Cited

U.S. PATENT DOCUMENTS

| | | | | | |
|---|---|---|---|---|---|
| 3,406,608 | A | | 10/1968 | Kostur | |
| RE32,547 | E | | 11/1987 | Reed | |
| 5,277,683 | A | | 1/1994 | Wilkins | |
| 5,430,914 | A | | 7/1995 | Patterson et al. | |
| 5,450,820 | A | * | 9/1995 | Kirsch | A01K 27/005 119/865 |
| 5,564,131 | A | * | 10/1996 | Anscher | A44B 11/2592 24/669 |
| 5,606,782 | A | | 3/1997 | Patterson et al. | |
| 5,782,727 | A | | 7/1998 | Pierce | |
| 5,867,877 | A | | 2/1999 | Patterson et al. | |
| 5,974,342 | A | | 10/1999 | Petrofsky | |
| 5,988,927 | A | * | 11/1999 | Pfarr | F16G 1/00 24/115 F |
| 6,360,404 | B1 | * | 3/2002 | Mudge | A01K 27/005 24/115 F |
| 6,671,933 | B1 | * | 1/2004 | Friend | F16G 15/08 24/115 F |
| 7,204,041 | B1 | | 4/2007 | Bailey, Sr. et al. | |
| 11,528,890 | B1 | * | 12/2022 | Munroe | A01K 27/005 |
| 2010/0029145 | A1 | * | 2/2010 | Balsells | H01R 39/20 439/827 |
| 2010/0069202 | A1 | | 3/2010 | Olsen | |
| 2011/0185979 | A1 | | 8/2011 | Dunagan | |
| 2011/0251033 | A1 | | 10/2011 | Blancher | |
| 2012/0129653 | A1 | | 5/2012 | Shalev et al. | |
| 2012/0245002 | A1 | | 9/2012 | Todd et al. | |
| 2013/0035614 | A1 | | 2/2013 | Casha | |
| 2013/0092088 | A1 | * | 4/2013 | Sharp | A01K 5/01 119/61.5 |
| 2013/0203567 | A1 | | 8/2013 | Thomas | |
| 2014/0073496 | A1 | | 3/2014 | Bannerman | |
| 2014/0274613 | A1 | | 9/2014 | DeMarco | |
| 2014/0373793 | A1 | | 12/2014 | McDermott | |
| 2016/0296787 | A1 | | 10/2016 | Kamins | |
| 2018/0199548 | A1 | * | 7/2018 | Jones | A44B 11/2592 |
| 2019/0087651 | A1 | | 3/2019 | Bose et al. | |
| 2019/0269967 | A1 | | 9/2019 | Thonmas | |
| 2021/0101044 | A1 | * | 4/2021 | Rachmaninoff | A61H 1/02 |

FOREIGN PATENT DOCUMENTS

| | | | | | |
|---|---|---|---|---|---|
| DE | 3820694 | A1 | | 12/1989 | |
| DE | 10121808 | C1 | | 7/2002 | |
| DE | 10200003 | A1 | | 1/2004 | |
| DE | 102004034386 | A1 | | 2/2006 | |
| DE | 102006051407 | B4 | | 10/2008 | |
| DE | 202010012268 | U | | 3/2011 | |
| DE | 102012100183 | B4 | | 3/2015 | |
| FI | 122551 | B | | 3/2012 | |
| KR | 100894914 | | | 4/2009 | |
| KR | 20110061845 | | | 10/2011 | |
| WO | WO-9734661 | A1 | | 9/1977 | |
| WO | WO-2015185873 | A1 | * | 12/2015 | F16B 45/00 |
| WO | 2017185112 | A1 | | 11/2017 | |
| WO | 2018203172 | A1 | | 11/2018 | |

OTHER PUBLICATIONS

Machine translation of KR application No. 1020090006207, publication No. 100894914, published Apr. 17, 2009.
Korean Patent Application for "Strength Exerciser".
Waldhausen, "Elastic Neck Stretcher," 3 pages. Publicly available before the filing date of Oct. 3, 2019.3 pages. Retrieved from the Internet: <https://www.wakdhausen.com/en/horsestraining-equipment/elastic-neck-stretcher.html/>.
Unknown, "Stretching Lungeing Workout Session with Sliding Side-Reins", Horse Pilates, electronically published Jan. 30, 2015, 4 pages. Retrieved from Internet: <http://lungeing-training.com/stretching-lungeing-workout-session-with-sliding-side-reins>.
Screen capture fromYou Tube video clip entitled "Persoa Training System with Molly Rosin", 4 pages, uploaded on May 22, 2012, by user "Bit of Britain". Retrieved from Internet: <https://www.youtube.com/waatch?y=V23UV6E_dbc>.
Screen capture from You Tube video entitled "how to lunge a horse with a Chambon lunge device", 5 pages. uploaded on Dec. 7, 2009, by user Horsemart. Retrieved from Internet: <https://www.youtube.com/watch?v=3zojObRn73s>.
Screen capture from You Tube video clip entitled "Areineo Orscana Horse Health Monitor", 6 pages, uploaded on Feb. 16, 2017, by user Urban Horses, Retrieved from Internet: <https://www.youtube.com/watch?v=dbe7FH0kP9g>.
Screen capture and audio transcription You Tube video clip entitled "HHP Massage Blanket English", 5 pages, uploaded on Jul. 5, 2012, by user "InFamous Productions", Retrieved from Internet: <https://www.youtube.com/watch?v=pLwTUL-PrGo>.
Unknown, "Steed—the world's first halter-free biometric wearable device for horses", Steed, publicly available before the filing date of Oct. 3, 2019, 4 pages. Retrieved from Internet: <http:////www.steedwatch.com>.
Nguyen, My, "Wearable Health Trackers for Horses", Wearable Technologies, published electronically on Apr. 6, 2016, 1 page. Retrieved from Internet: <https://www.wearable-technologies.com/201604/wearable-health--trackers-forhorses/>.
Unknown, "Case Study: How Eliza gets peace of mind with Trackener", publicly available before the filing date of Oct. 3, 2019, 3 pages. Retrieved from Internet: <https://www.trackener.com/en/product>.

* cited by examiner

ANIMAL HANDLING DEVICE AND SAFETY RELEASE

This application claims priority to U.S. provisional application Ser. No. 63/580,121, filed Sep. 1, 2023, titled "Animal Handling Device and Safety Release."

FIELD OF THE INVENTION

The present invention relates to the care of horses and other large and small animals. More specifically, the present invention relates to devices for aiding a person engaged with a horse or other animal or for restraining movement of an animal.

BACKGROUND OF THE INVENTION

It is often useful for a trainer, veterinarian, or other person to move and stretch a leg of a horse or other large animal for purposes of assessing or rehabilitating an injury or for conditioning. Also, it is at times useful to restrain movement of an animal for various purposes.

SUMMARY OF THE INVENTION

In the animal handling device of the present invention a breakaway function is integrated into the overall assembly of the device allowing the device to separate upon exertion of a force exceeding a predetermined value. That is, when sufficient force is exerted on the handling device by the leg or other part of the horse or other animal in a first direction and by a person using the device or by a support in the opposite direction, a portion of the device engaged with the horse or other animal separates from a portion engaged with the person using the device or the support. In some applications, a device incorporating a safety release of one embodiment of the present invention limits movement of an animal, with one part of the device engaged with the animal and another part engaged with a person or support.

A preferred embodiment of the handling device comprises a boot for engaging with the leg of a horse or other subject animal to be moved or stretched, and a first handle coupled to one part of a boot and a second handle coupled to a second part of the boot. In one embodiment, a single handle is coupled via straps to two parts of the boot. A first buckle is coupled via one or more straps to a first part of the boot, and a second buckle engaged with the first buckle is coupled via one or more straps to a handle for use in pulling on the boot. In a preferred embodiment, the first and second buckles are joined together when a pin on one buckle is inserted into a socket on the other buckle and restrained from axial movement by a radial canted coil spring held by a groove on the pin and a groove on the socket axially aligned at least in part with the groove on the pin. When a strong enough force is applied pulling the two buckles in opposite directions, the pin pulls out of the socket and the two buckles separate. In one embodiment, the force at which the canted coil spring is radially compressed enough to allow the pin to withdraw from the socket, thus separating the first and second buckles and uncoupling the handle from the boot, is 60 lbs.+/−10%. In other applications, the present invention can be configured to release upon application of a force of less than or greater than 60 lbs. In one embodiment, the force required for the safety release to separate is determined by internal components and their geometry as explained hereinafter. In one embodiment, a pair of first and second buckles providing a breakaway function is incorporated into the straps on each of two parts of a boot that engages a part of a horse or other animal. In use, if the horse or other animal suddenly jerks while engaged with the device, a person holding onto a handle of the device and the animal being engaged by the device are protected against injury by the breakaway function provided by the separation of the two buckles. Other variations of the stretching device of the present invention include a safety release mechanism other than a pin, socket, and radial coiled spring.

The safety release of the present invention is also useful, for example, for equestrian lunge lines, cross ties, trailer ties, and safety halters, leashes, and dog tiedowns and tie outs. A lunge line for horses, is a long, single rein and provides a means of communication between the handler and the horse during lunging. A cross tie for horses is two ties on opposite sides, each attached to a side of a wall or a post, etc. Cross ties are commonly made of rope or strap. Trailer ties clip to a horse's halter and attach to a trailer. Many equestrians use trailer ties because they are convenient and break away in the event of the horse being spooked or otherwise suddenly pulling away. Safety halters, or breakaway halters, are halters that incorporate a replaceable breakaway, for example, a crown or leather strap. Breakaway halters are made to break apart when the horse panics or otherwise suddenly pulls away. Tiedowns for dogs are used by groomers, veterinarians, and other handlers to hold dogs in a desired position. Tie outs for dogs are leash-like, one end attaching to the dog's collar and the other to, for example, a stake in the ground. Currently, the breakaway feature of the foregoing devices is provided by using Velcro or leather. Alternative embodiments of the present invention incorporate into the foregoing devices a safety release comprising a pin, socket, and radial coil spring of the type described herein, dimensioned appropriately for the respective application. The safety release of the present invention is an improvement over the use of Velcro or leather to provide a breakaway function.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations and may include exaggerated material for Illustrative purposes.

In the figures, similar components or features may have the same numerical reference label. Further, various components of the same type may be distinguished by following the reference label by a letter that distinguishes among similar components or features. If only the first numerical reference label is used in the specification, the description is applicable to any one of the similar components or features having the same first numerical reference label irrespective of the letter suffix.

DETAILED DESCRIPTION

Figure 1A:
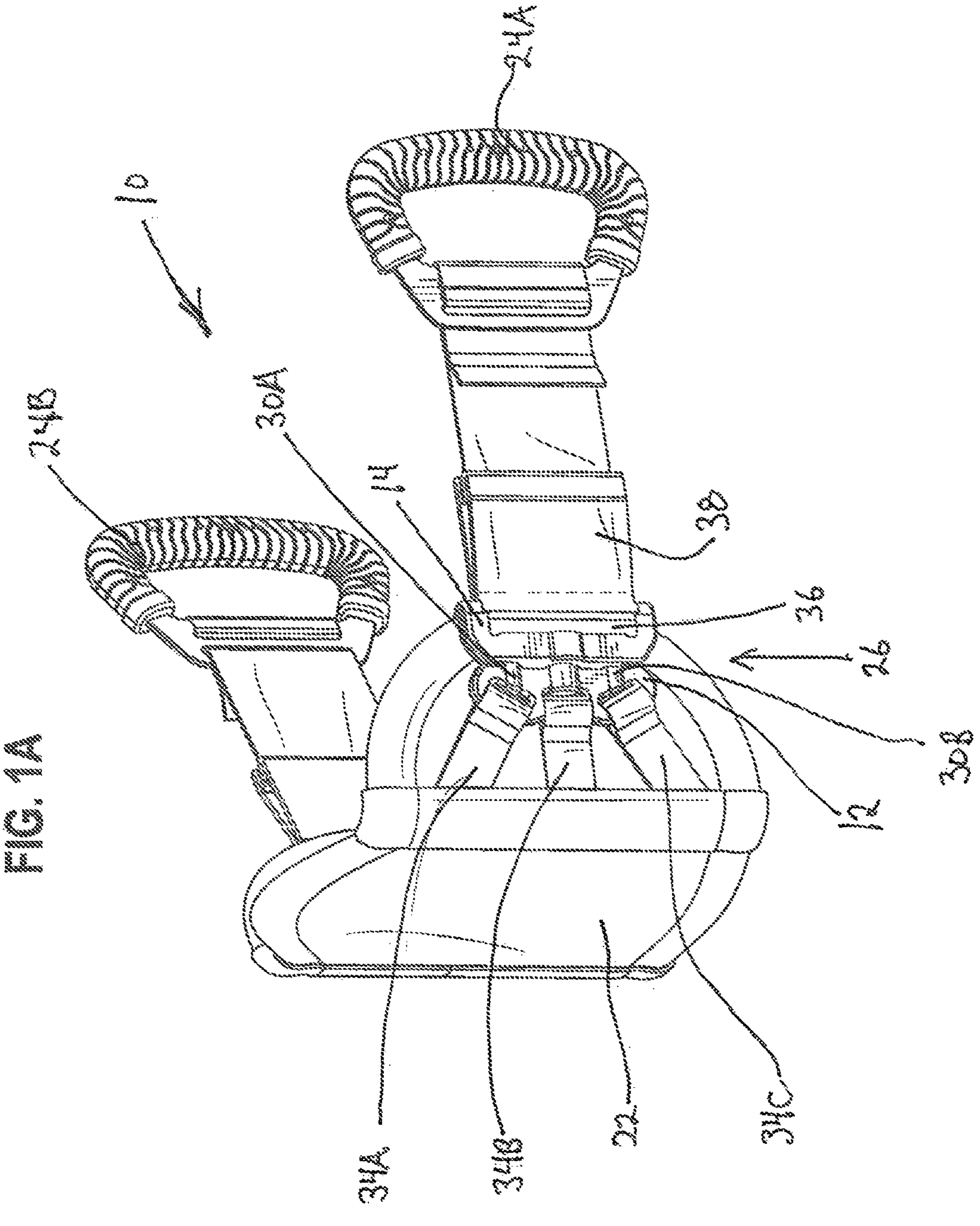
FIG. 1A is a perspective view of an embodiment of a handling device of the present invention having two handles, each coupled to a respective side of a boot, with a safety release.
Figure 1B:
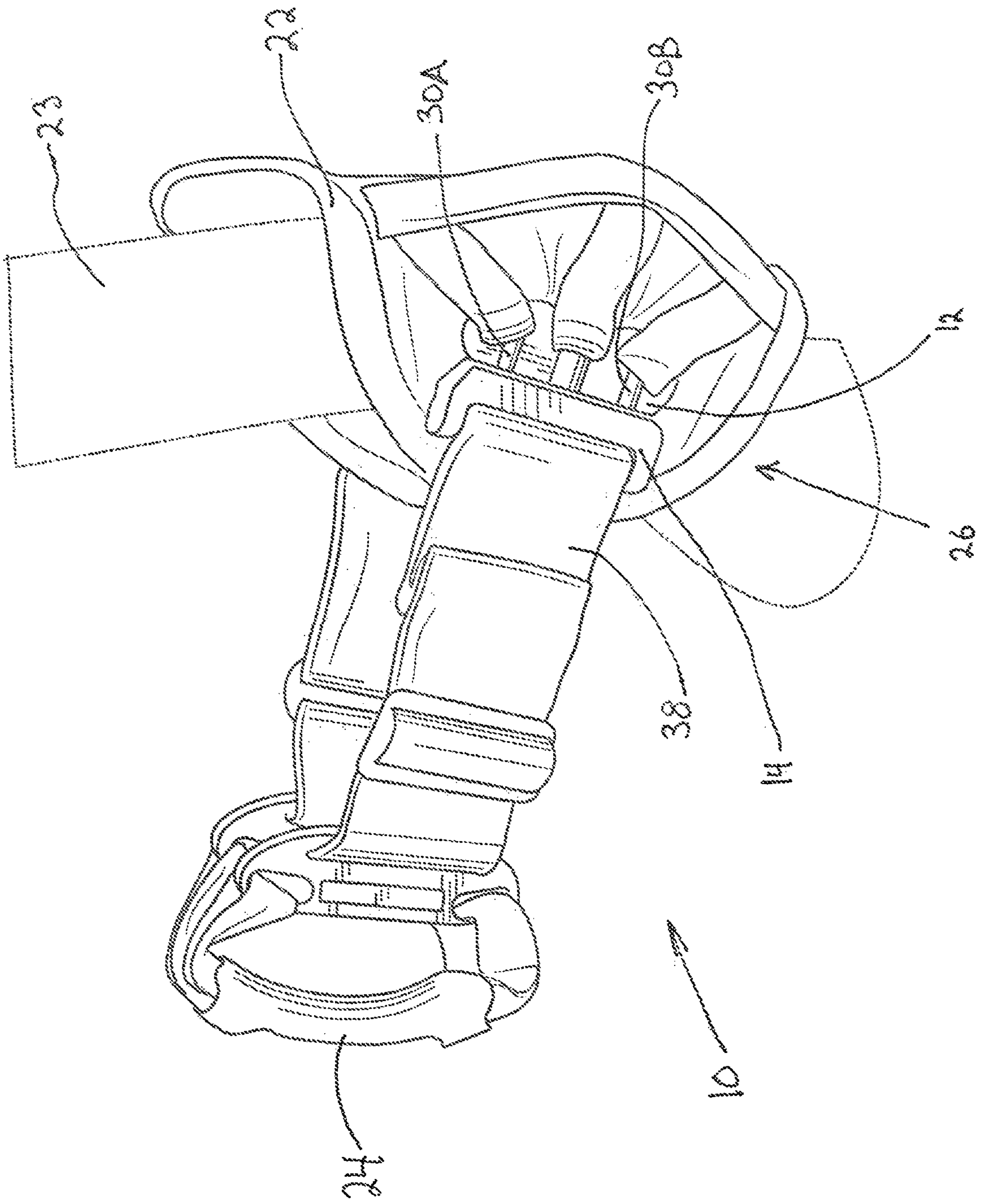
FIG. 1B is a perspective view of another embodiment of a handling device of the present invention having a single handle coupled by straps to both sides of a boot and having a safety release.
Figure 2:
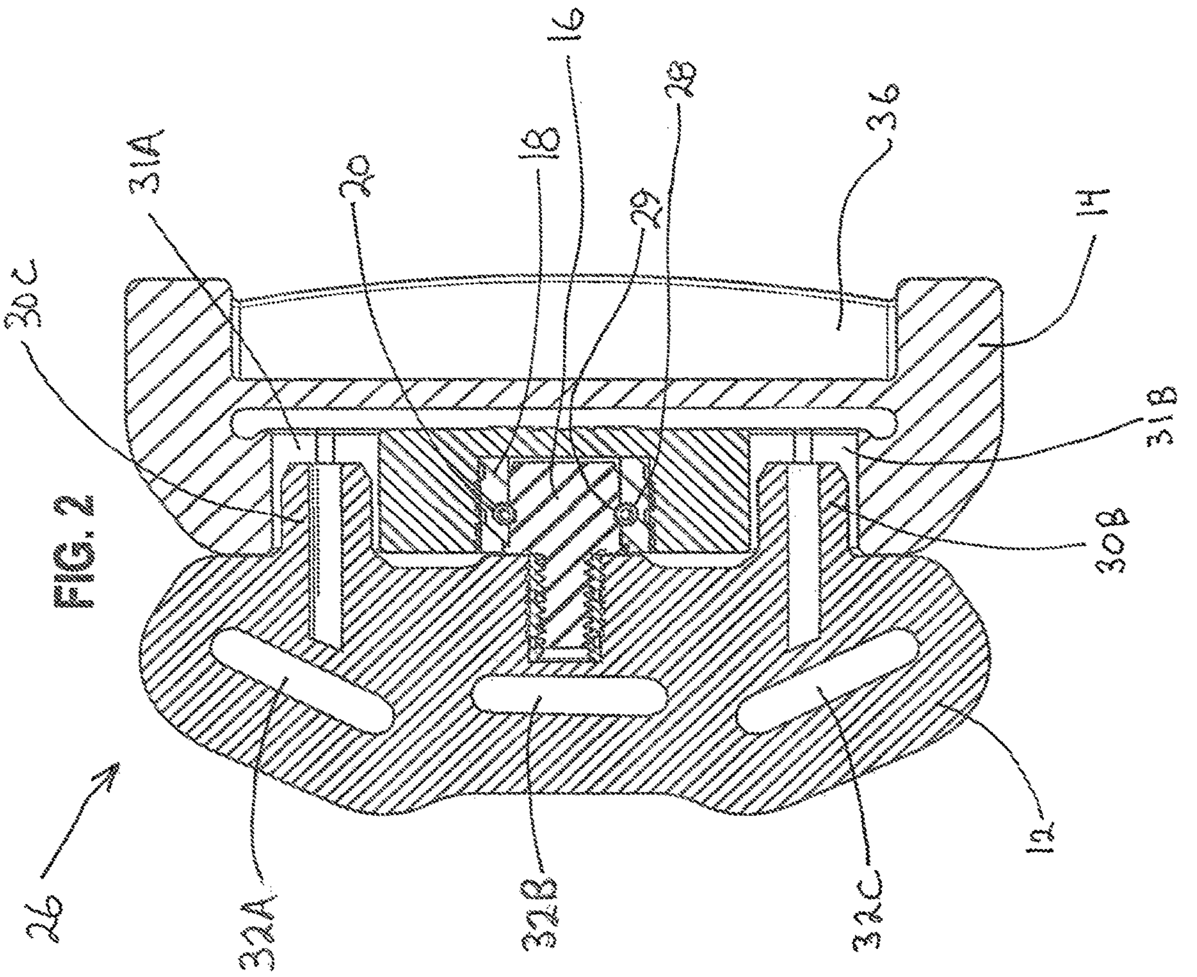
FIG. 2 is a cross-sectional schematic view of a safety release having a pin side buckle joined with a socket side buckle used in an embodiment of the present invention.
Figure 7B:
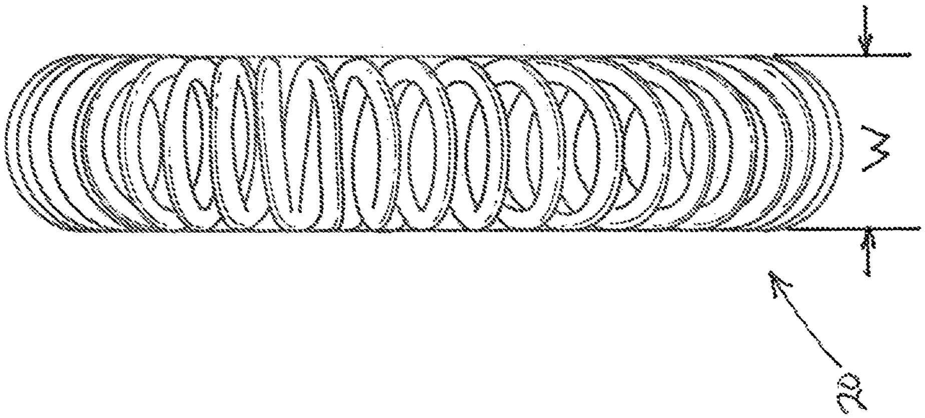
FIG. 7B is an edge view of a radial tapered coil spring used in one embodiment of the present invention.

A perspective view of two embodiments of a handling device 10 of the present invention are shown in FIGS. 1A and 1B. With reference to FIGS. 1A and 1B, in two embodiments of the handling device of the present invention 10, a breakaway or safety release function is provided by two buckles 12, 14 that couple a boot 22 to handles 24A, 24B (FIG. 1A) or to handle 24 (FIG. 1B). The buckles 12, 14 are formed to separate upon application of sufficient force pulling the boot 22 away from handle 24 or handles 24A, 24B, and thereby separating the two buckles 12, 14 and decoupling boot 22 from handle 24 or handles 24A, 24B. With reference to FIGS. 1A, 1B, and 2, the two buckles comprise a pin side buckle 12 and a socket side buckle 14. A pin 16 on pin side buckle 12 is retained in socket 18 on socket side buckle 14 by compression force of radial canted coil spring 20. A cross-section of radial canted coil spring 20 is elliptical (see FIGS. 7A and 7B). The compression force for a radial canted coil spring is along the radius of the arc or ring, perpendicular to the centerline. In another embodiment, the positions of pin side buckle 12 and socket side buckle 14 could be interchanged from that shown in FIGS. 1A, 1B, and 2. FIG. 1B shows boot 22 of handling device 10 engaged with the leg 23 of a horse or other animal.

The animal handling device of the present invention is not limited to the specific safety release mechanism described herein using a pin, socket, and radial tapered coil spring. Safety release mechanisms using configurations, materials, and dimensions of springs, pins, and sockets other than the design described in this application could be used in the stretching device of the present invention. In addition, other types of safety release mechanisms to provide the desired breakaway function could be used in the stretching device of the present invention in place of the safety release latch 26 in FIGS. 1A, 1B, and 2. Such alternative safety release mechanisms would not necessarily include a radial tapered coil spring, a pin, and a socket. In some embodiments, two buckles are held together by Velcro or other material formed to separate upon application of force exceeding a desired threshold pulling the tow buckles apart.

FIG. 2 is a schematic view of a cross-section of safety release latch 26 (also sometimes referred to herein as "safety release") employed in one embodiment of the present invention showing pin 16 of pin side buckle 12 seated in socket 18 of socket side buckle 14. Radial canted coil spring 20 rests in groove 28 in socket 18 and groove 29 in pin 16. When pin 16 is inserted into socket 18, radial canted coil spring 20 compresses radially, applying a force against pin 16 tending to grip pin 16 and hold it within socket 18.

Figure 3B:
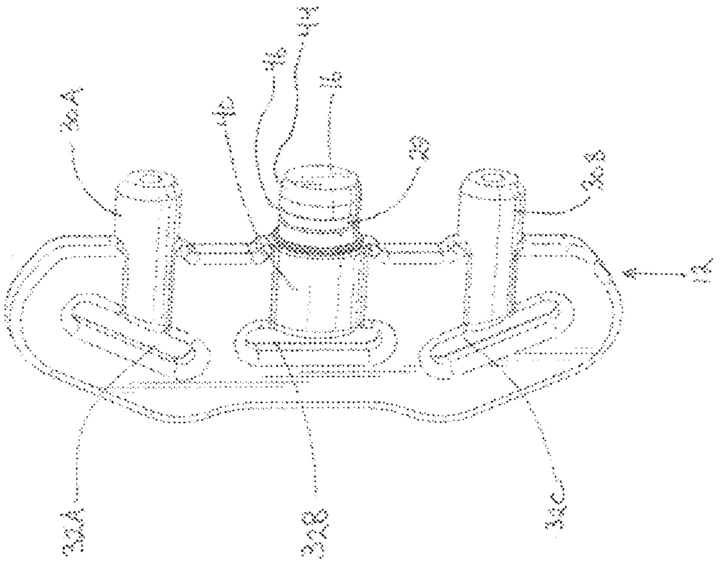
FIG. 3B is a perspective view of a pin side buckle used in one embodiment of the handling device of the present invention.
Figure 3A:
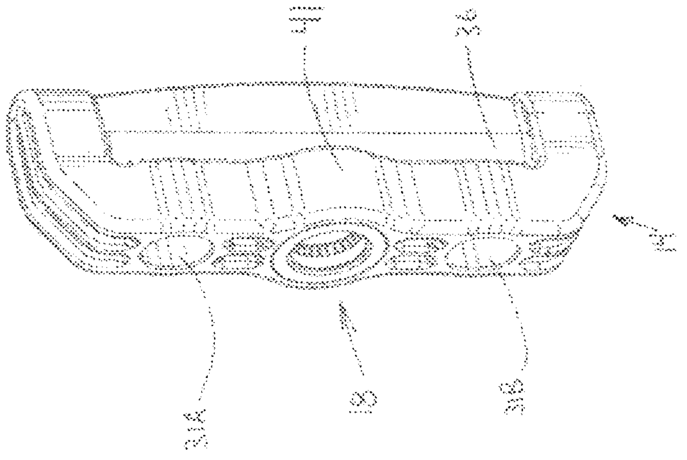
FIG. 3A is a perspective view of a socket side buckle used in one embodiment of the handling device of the present invention.

Radial canted coil spring 20 (see FIGS. 2, 7A, and 7B), lead-in radius 44 of pin 16 (FIGS. 2, 3B, 4B, and SA), and the configuration of socket 18 (FIGS. 2, 3A, 4A, and 6A) provide a low insertion force for inserting pin 16 into socket 18. In one embodiment, a taper (i.e., lead-in radius 44) of tapered pin 16 reduces side-loading and binding during insertion of pin 16 (see FIGS. 2, 3B, 4B, and SA) into socket 18 (see FIGS. 2, 3A, 4A and 6A). Pin 16 is inserted into the left end of socket 18 in FIG. 6A as indicated by an arrow. Application of a force exceeding a predetermined release force pulling pin side buckle 12 and socket side buckle 14 away from each other causes radial canted coil spring 20 to compress radially against chamfer 46 (FIG. SA) as pin 16 begins to withdraw from socket 18, and as pin 16 is withdrawn farther, radial canted coil spring 20 slides up along chamfer 46 onto the maximum radius of pin 16, allowing pin 16 to withdraw completely from socket 18 and separating pin side buckle 12 and socket side buckle 14.

In an embodiment shown in FIGS. 1A, 1B, 2, 3B, and 4B pin side buckle 12 includes a substrate 40 having three slot openings 32A, 32B, and 32C to receive three straps 34A, 34B, and 34C as shown in FIGS. 1A and 1B, each of which is coupled to boot 22 (see FIGS. 1A and 1B). Straps 34A, 34B, and 34C comprise a first section of strap coupled to boot 22. Socket side buckle 14 includes a slot 36 to receive a second section of strap 38 coupled to handle 24A (see FIG. 1A) or 24 (FIG. 1B). Also, in other embodiments the positions of pin side buckle 12 and socket side buckle 14 could be reversed, the former being couple to boot 22 and latter to handle 24A (FIG. 1A) or 24 (FIG. 1B), or socket 18 could be incorporated into the buckle on the boot side and pin 16 could be incorporated into the buckle on the handle side.

Figure 4A:
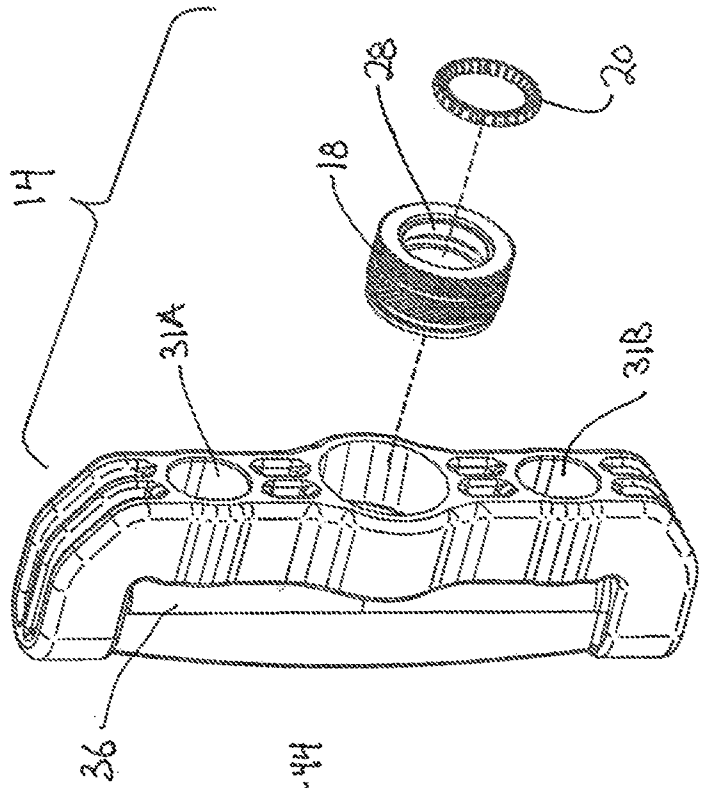
FIG. 4A is an exploded view of a socket side buckle used in one embodiment of the present invention.
Figure 4B:
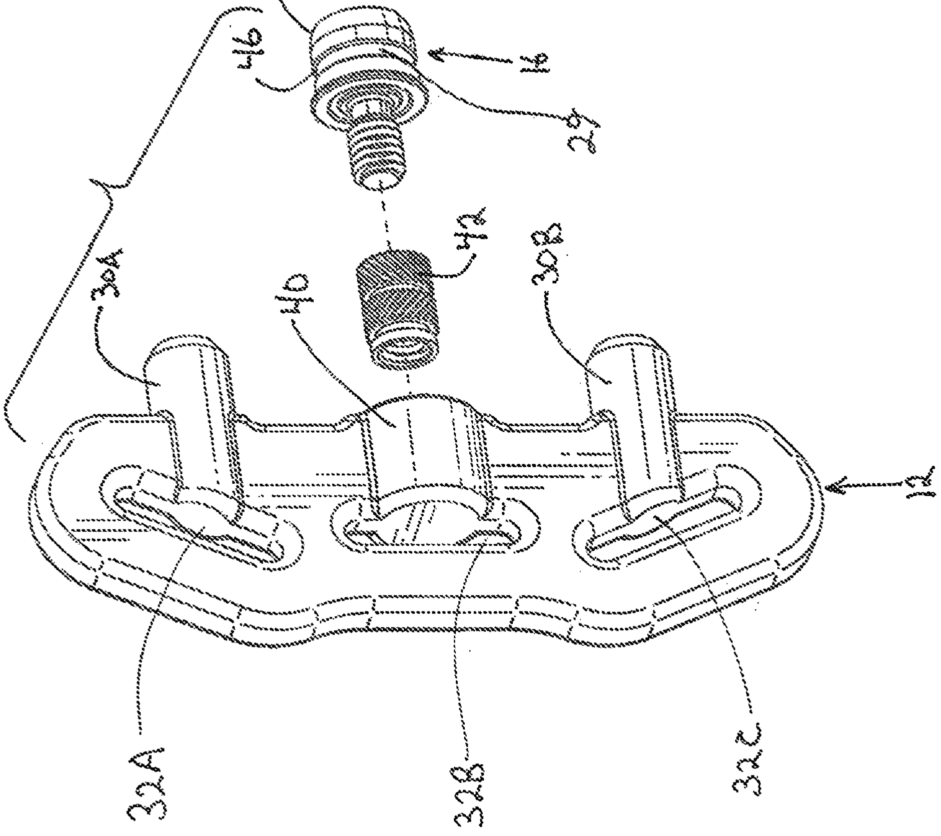
FIG. 4B is an exploded view of a pin side buckle used in one embodiment of the present invention.
Figure 5B:
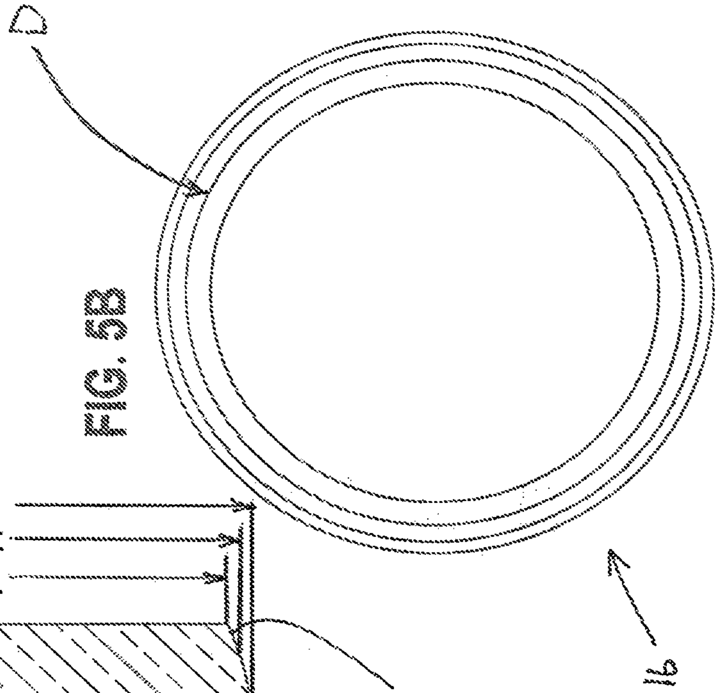
FIG. 5B is an end view of a pin used in one embodiment of a safety release in one embodiment of the present invention.
Figure 5A:
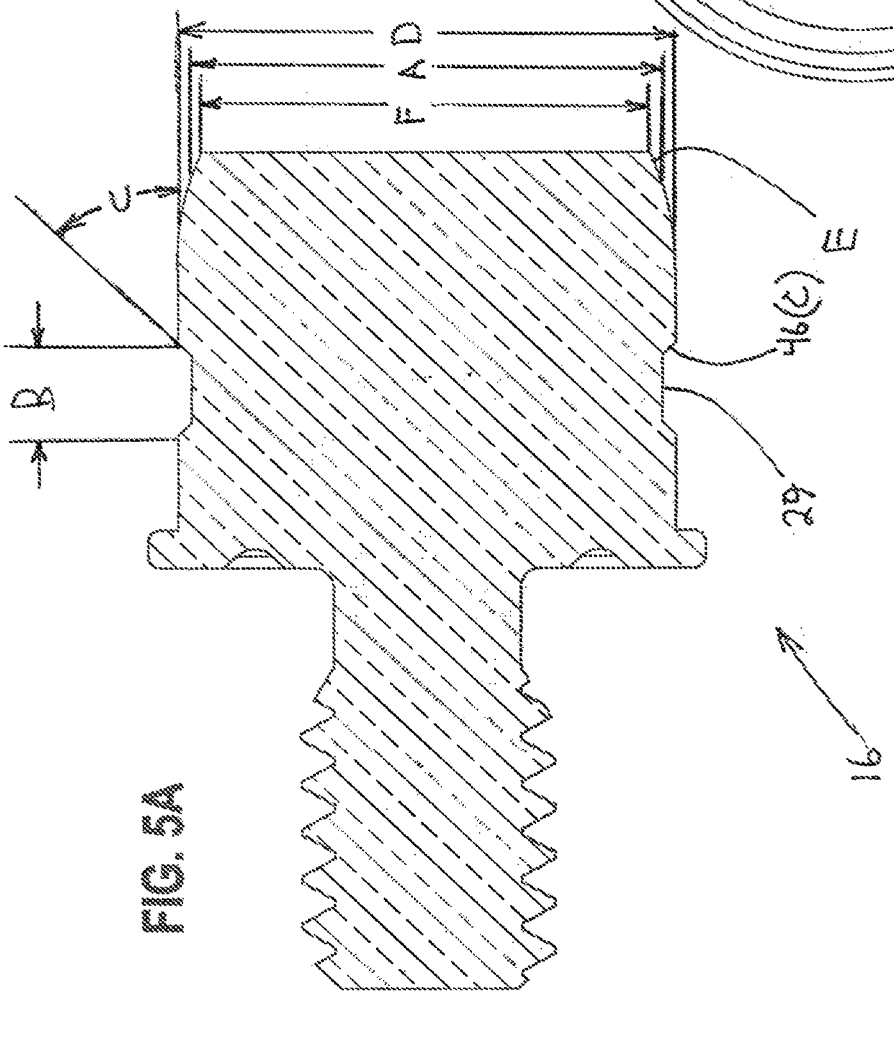
FIG. 5A is a side view of a cross-section of a pin used in one embodiment of a safety release in one embodiment of the present invention.

Pins 30A and 30B in pin side buckle 12 (shown in FIGS. 1A, 1B, 2, 3B, and 4B) are received, respectively, in openings 31A and 31B in socket side buckle 14 (FIGS. 1A, 1B, and 2) to prevent rotation between socket side buckle 14 and pin side buckle 12. In one embodiment pins 30A and 30B are plastic. In one embodiment, pin 16 (see FIGS. 3B, 4B, and SA) is integrated into a plastic substrate 40. Alternatively, other integration techniques could be employed. In one embodiment, a threaded insert fastener 42 (FIG. 4B) is heat staked into plastic substrate 40. Pin 16 is then threaded into fastener 42, as shown in FIG. 4B. In a preferred embodiment, pin 16 is brass or stainless steel, but other materials could be used instead.

With reference to FIGS. SA and SB, the following features of pin 16 affect the release force for the safety release function: groove diameter A; groove width B; groove edge chamfer C; pin diameter D; pin lead-in radius E; and pin nose diameter F. One embodiment of the present invention provides a release force of about 60 lbs.±10 employing a radial canted coil spring having a width of 0.5 inch. A suitable radial canted coil spring may be procured by specifying the desired release force, insertion force, and size envelope.

In one embodiment of safety release latch 26 of the present invention, tapered pin 16 and socket 18 have the following specifications:

TABLE 1

| | | |
|---|---|---|
| Pin 16 | Groove Diameter A | 0.465 ± 0.001 inch |
| | Groove Width B | 0.098 inch |
| | Groove Edge Chamfer C | 45° ± 1° |
| | Pin Diameter D | 0.492 ± 0.001 inch |
| | Pin Lead-in Radius E | 0.273 inch |
| | Pin Nose Diameter F | 0.443 ± 0.005 |
| Socket 18 | Groove Diameter G | 0.629 ± 0.001 inch |
| | Groove Width H | 0.097 ± 0.001 inch |
| | Socket Internal Diameter ID | 0.500 ± 0.002 inch |
| | Grove Radius J | 0.030 max |

Configurations and dimensions of tapered pins, sockets, and canted coil springs other than those in the above table also could be used in a safety release mechanism in the stretching device of the present invention.

In one embodiment, pin 16 is tapered from a nose diameter F of 0.443±0.005 inch to the pin lead in radius E of 0.273 inch, which tends to prevent side-loading from causing binding of pin 16 as it is inserted into socket 18.

In one embodiment employing radial canted coil spring 20 (FIGS. 2, 7A, and 7B), socket side buckle 14 (FIGS. 1A, 1B, 2, 3A, and 4A) integrates a metal socket 18 (FIGS. 3A and 4A) into plastic substrate 41. Other materials and fabrication methods also could be used. Radial canted coil spring 20 is positioned in, and restrained against axial movement by, groove 28 in socket 18 and groove 29 in pin 16. In one embodiment, socket 18 is made of brass, but alternatively other materials such as stainless steel could be used. In one embodiment, socket 18 is fixed in position in plastic substrate 41 by heat staking.

Figure 6B:
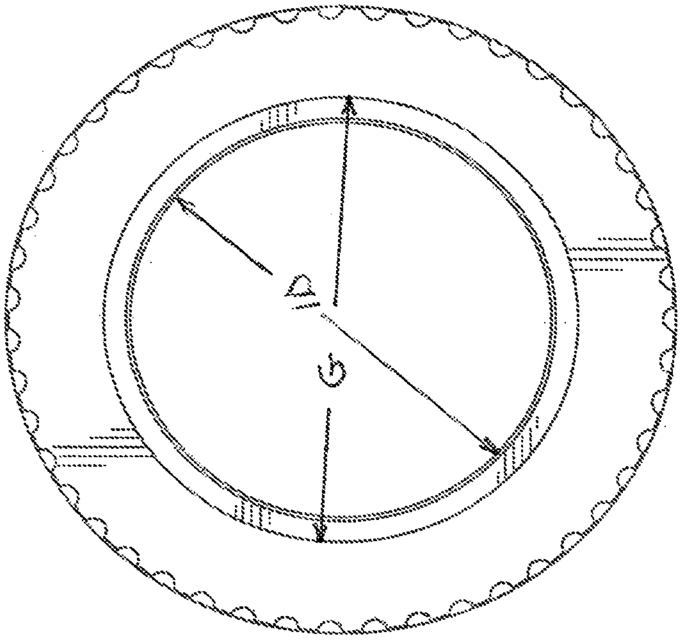
FIG. 6B is an end view of a socket used in one embodiment of a safety release in one embodiment of the present invention.
Figure 6A:
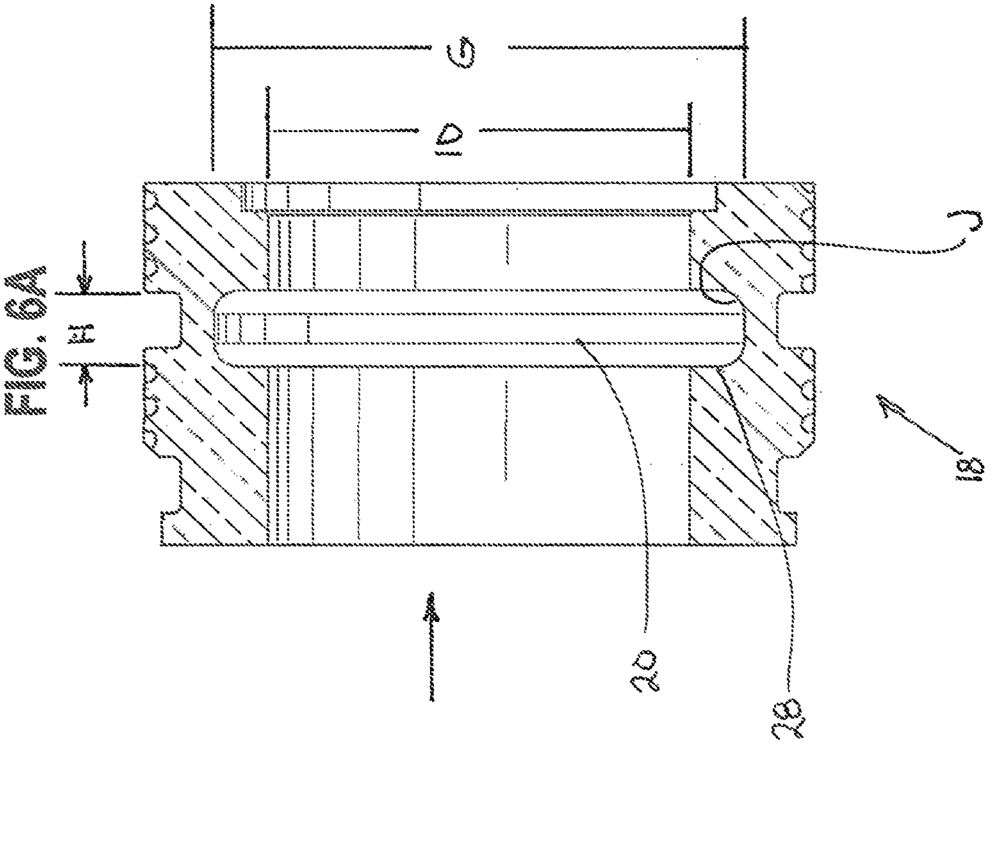
FIG. 6A is a side view of a cross-section of a socket used in one embodiment of a safety release in one embodiment of the present invention.

In an embodiment of safety release latch 26 shown in FIGS. 6A and 6B, groove diameter, groove width, socket internal diameter, and groove radius affect the amount of force required for pin 16 to overcome the radial bias of canted coil spring 20 and withdraw from socket 18 to provide the safety release function. In one embodiment, the dimensions of these features of socket 18 are set forth in Table 1 above.

Figure 7A:
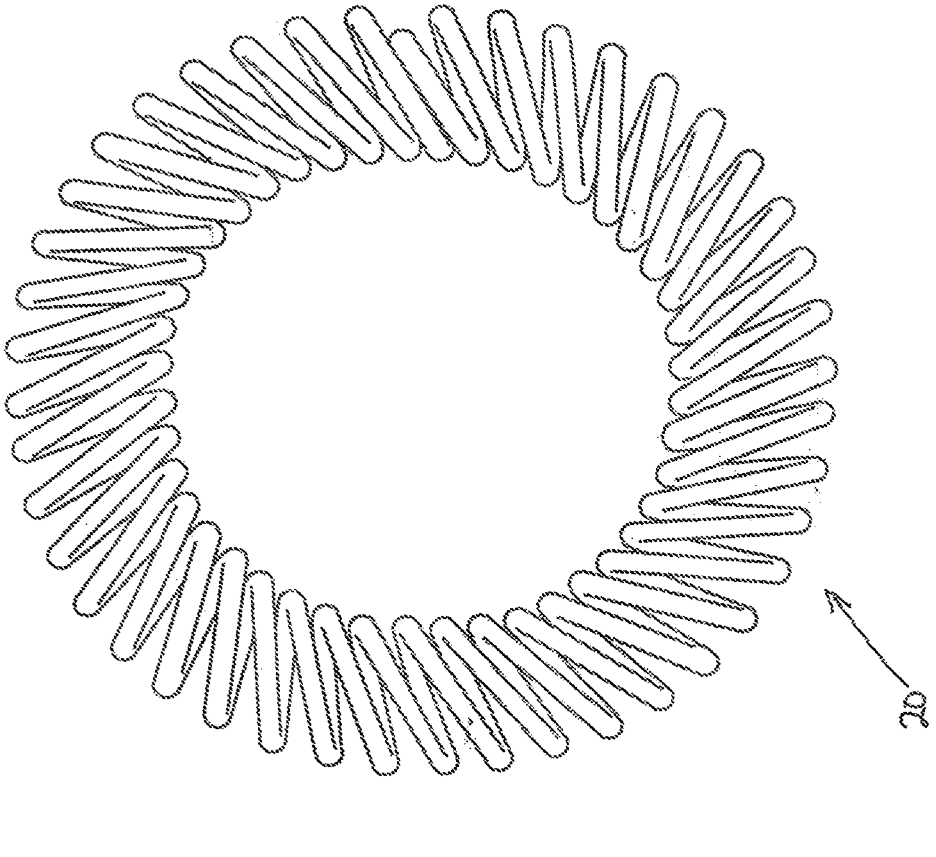
FIG. 7A is a side view of a radial tapered coil spring used in one embodiment of the present invention.

FIGS. 7A (side view) and 7B (edge view) show a radial canted coil spring 20 suitable for use in safety release latch 26 of the animal handling device 10 of the present invention. With reference to FIGS. SA, SB, 6A, 6B, 7A, and 7B, spring inner diameter (ID), coil width, coil wind angle, wire gage, and wire temper affect the release force and function of safety release latch 26. In general, the smaller the spring inner diameter (ID), the less the release force will be, and the larger the spring inner diameter ID, the greater the release force. A radial canted coil spring together with appropriate tapering on pin 16 and dimensioning of socket 18 provide low insertion force and a desired release force. Configurations and dimensions of tapered pins, sockets, and canted coil springs other than those in Table 1 above also could be used in a safety release mechanism in the stretching device of the present invention.

Figure 8:
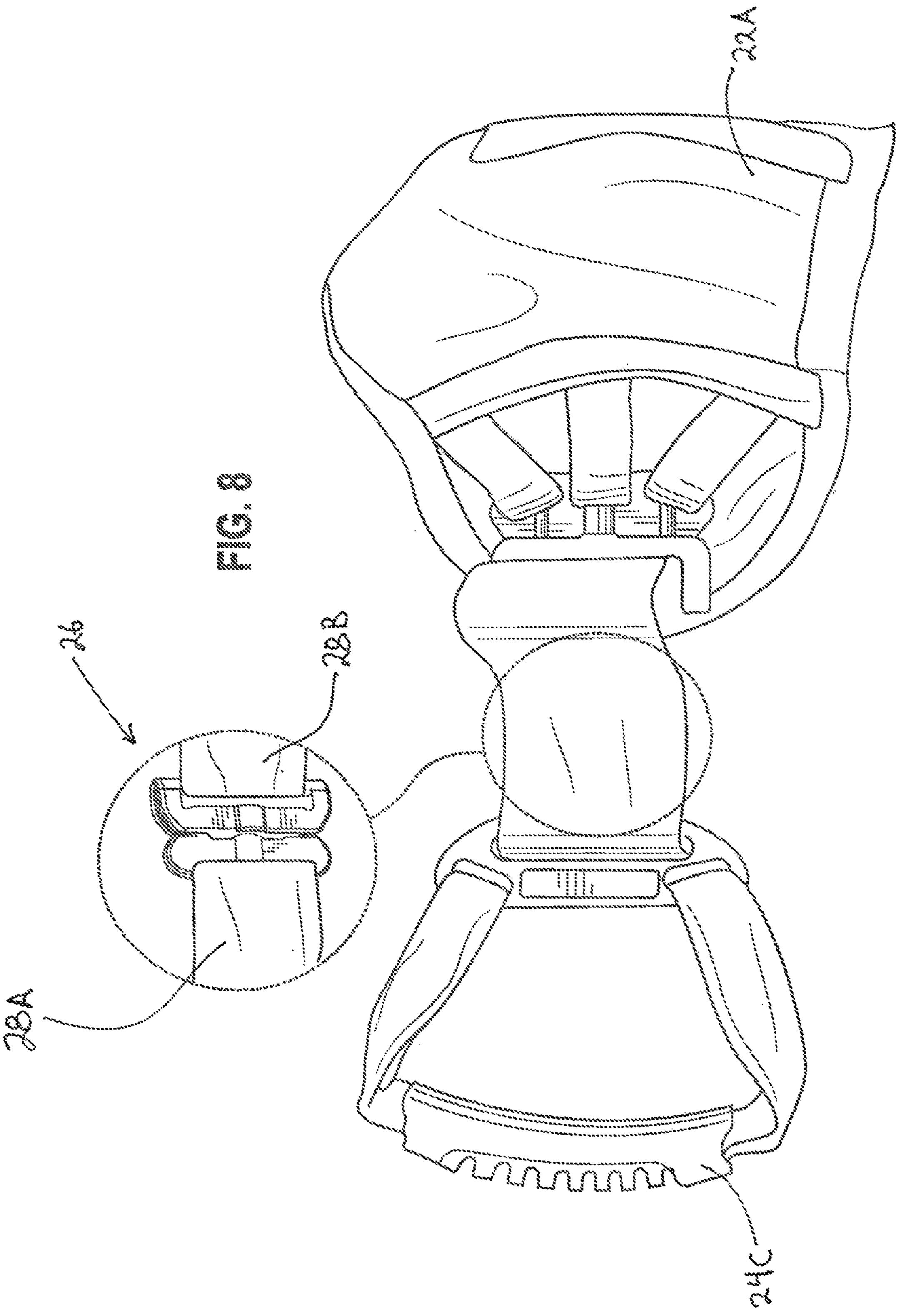
FIG. 8 is a perspective view of another embodiment of a handling device of the present invention with the buckles of a safety release positioned between straps coupled respectively to a handle and to a boot.
Figure 9:
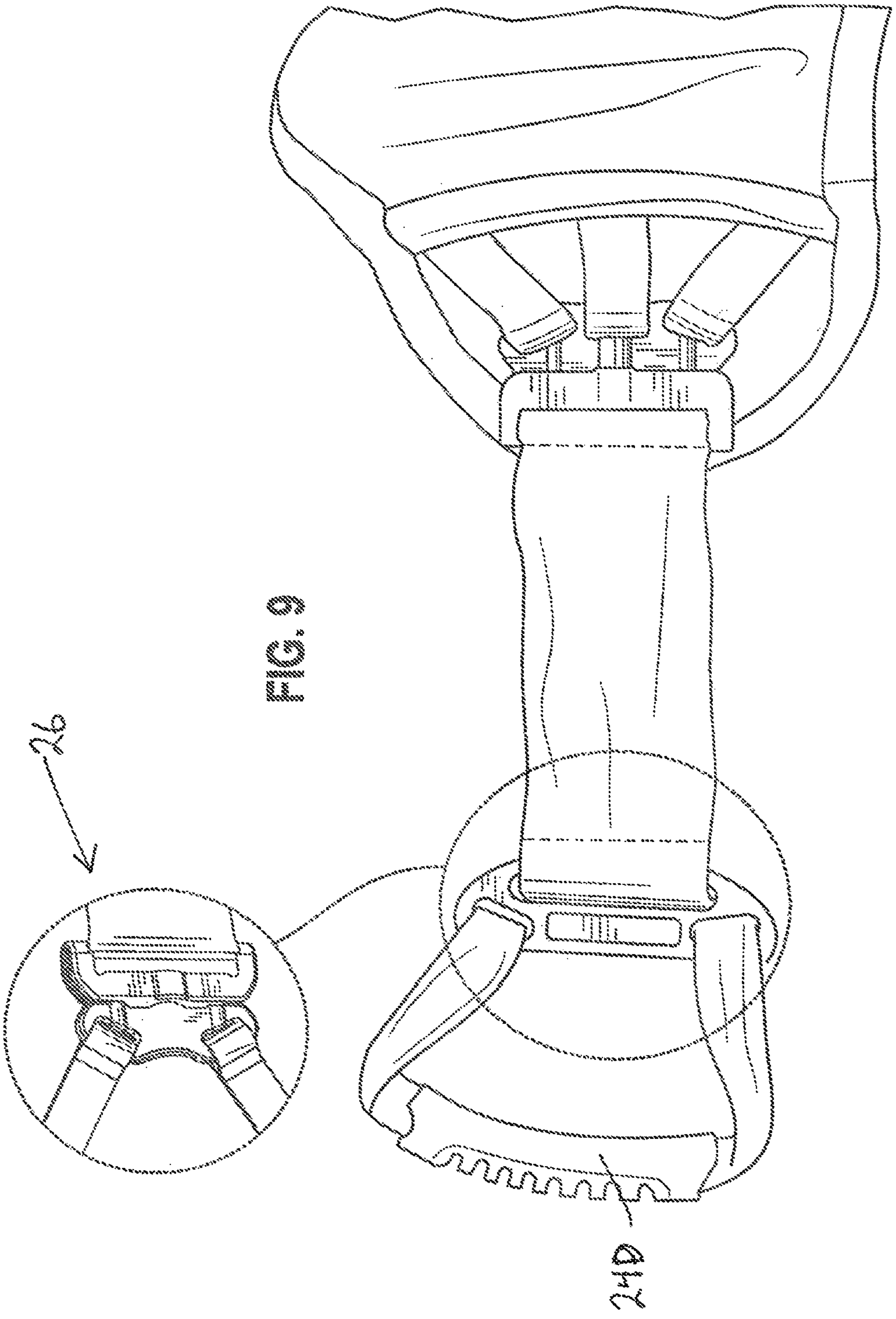
FIG. 9 is a perspective view of another embodiment of a handling device of the present invention with the buckles of a safety release positioned near a handle.

FIG. 8 shows an embodiment of the present invention with safety release 26 positioned on a strap between a boot and a handle. FIG. 9 shows an embodiment of the present invention with safety release 26 positioned near a handle of an animal handling device of the present invention.

In addition to an animal handling device, safety release latch 26 of the present invention may be positioned between ends of, or at an end of, a strap in various other applications, such as equestrian lunge lines, cross ties, trailer ties, and safety halters, leashes, and dog tiedowns and tie outs. A lunge line for horses, is a long, single rein and a means of communication between the handler and the horse during lunging. A cross tie for horses is two ties, each attached to a side of a wall or a post, etc. Cross ties are commonly made of rope or strap. Trailer ties clip to a horse's halter and attach to a trailer. Many equestrians use trailer ties because they are convenient and break away in the event of the horse being spooked or otherwise suddenly pulling away. Safety halters, or breakaway halters, are halters that incorporate a replaceable breakaway, for example, crown or leather strap. Breakaway halters are made to break apart when the horse panics or otherwise suddenly pulls away. Tiedowns for dogs are used by groomers, veterinarians, and other handlers to hold the dog in a desired position. Tie outs for dogs are leash-like, one end attaching to the dog's collar and the other to, for example, a stake in the ground. In the foregoing applications, the breakaway function may be provided by the tapered pin, socket, and radial coiled spring described above, appropriately sized for a desired release force.

How It Works:

When pin side buckle 12 and socket side buckle 14 are pushed together, pin 16 moves into socket 18, causing radially canted coil spring 20 to compress radially outward as the spring slides up along radius 44 and then, after pin 16 is inserted far enough to align pin groove 29 with socket groove 28, to expand into groove 28 on socket 18 and groove 29 on pin 16. Groove 28 in socket 18 restrains canted coil spring 20 from moving axially. Spring 20 can, however, expand radially in socket groove 28. Once pin 16 is fully seated with spring 20 in groove 29, canted coil spring 20 rests in both groove 29 of pin 16 and groove 28 of socket 18. This secures pin side buckle 12 to buckle side buckle 14.

When an axial force is applied pulling pin side buckle 12 and socket side buckle 14 in opposite directions, a radially outward force is applied to spring 20 by chamfer 46 of groove 29 in pin 16. When the radial force on canted coil spring is sufficient to overcome the canted coil spring force, spring 20 expands radially into socket groove 28, and pin 16 is free to release from socket 18. In one embodiment, an axial force of about 60 pounds (60 lbs.) pulling pin side buckle 12 away from socket side buckle 14 is sufficient to radially expand spring 20 and release pin 16 from socket 18. When sufficient axial force is applied pulling buckles 12 and 14 apart, they separate.

It takes less force to push pin 16 into socket 18 than to retract pin 16 from socket 18 due to the geometry of pin 16. In one embodiment, the gradual pin lead-in radius 44 (also labeled E in FIG. SA) is 0.273 inch and the chamfer 46 (also labeled C in FIG. SA) on the edge of groove 29 in which the spring rests is sharply steeper at 45 degrees. The lead-in radius and the chamfer each act as a wedge. The shallower and more gradual the wedge angle, the easier the pin can move across the surface; the steeper and sharper the angle, the greater the force required. In one embodiment, the insertion force is about half the release force, i.e., the force required to withdraw pin 16 from socket 18.

In the preceding description, for the purposes of explanation, numerous details have been set forth to provide an understanding of various embodiments of the present invention. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, some well-known processes and elements have not been described in order to avoid unnecessarily obscuring the present invention. Accordingly, the above description should not be taken as limiting the scope of the present invention.

Where a range of values is provided herein, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that state range is encompassed. The upper and lower limits of those smaller ranges may independently be included or excluded in the range, and each range where either, neither, or both limits are included in the smaller ranges is also encompassed with the present invention, subject to any specifically excluded limit in the stated range. Where the stated range includes one or both of the limits, ranges excluding either or both of those included limits are also included. Where multiple values are provided in a list any range encompassing or based on any of those values is similarly specifically disclosed.

As used herein, and in the appended claims, the singular forms “a”, “an”, and “the” include plural references unless the context clearly dictates otherwise. Thus, for example, reference to “a material” includes a plurality of such materials, and reference to “the coil” includes reference to one or more coils and equivalents thereof known to those skilled in the art, and so forth.

Also, the words “comprise(s)”, “comprising”, “contain(s) ”, “containing”, “include(s)”, and “including”, when used in this specification and the following claims, are intended to specify the presence of stated features, integers, and components, or operations, but they do not preclude the presence or addition of one or more other features, integers, components, operations, acts, or groups.

What is claimed is:

1. An animal handling device comprising:

a strap having a first section and a second section;

a first side buckle coupled to a first end of the first section of the strap, the first side buckle comprising a pin having an outer pin diameter and an annular groove having a pin groove diameter, wherein the outer pin diameter is larger than the pin groove diameter;

a second side buckle coupled to a first end of the second section of strap, the second side buckle comprising a socket having an axial passageway of a first socket diameter, the axial passageway having a socket groove of a socket groove diameter, wherein the socket groove diameter is larger than the first socket diameter;

a radial canted coil spring, the radial canted coil spring in an uncompressed state having an outer diameter larger than the socket groove diameter and an inner diameter smaller than the pin groove diameter;

wherein the axial passageway of the socket is adapted to receive the pin to an axial distance where the pin groove and the socket groove are at least partially axially aligned; and wherein at a position of the pin in the axial passageway of the socket where the pin groove and the socket groove are at least partially axially aligned the radial canted coil spring is compressed between the pin groove and the socket groove.

2. The animal handling device of claim 1 wherein at a position of the pin in the axial passageway of the socket where the pin groove and the socket groove are at least partially axially aligned an outer portion of the radial canted coil spring is positioned in the socket groove and an inner portion of the radial canted coil spring is position in the pin groove.

3. The animal handling device of claim 1 wherein an edge of the pin groove is chamfered.

4. The animal handling device of claim 1 wherein an edge of the socket groove has a radius.

5. The animal handling device of claim 1 wherein the pin has a nose and a body portion, wherein the diameter of the nose is smaller than the diameter of the body portion, and wherein the pin has a lead-in radius from the nose to the body portion.

6. An animal handling device comprising:

a strap having a first section and a second section;

a pin side buckle coupled to a first end of the first section of the strap, the pin side buckle comprising a pin having an outer pin diameter and an annular groove having a pin groove diameter, wherein the outer pin diameter is larger than the pin groove diameter;

a socket side buckle coupled to a first end of the second section of strap, the socket side buckle comprising a socket having an axial passageway of a first socket diameter, the axial passageway having a socket groove of a socket groove diameter, wherein the socket groove diameter is larger than the first socket diameter;

a radial canted coil spring, the radial canted coil spring in an uncompressed state having an outer diameter larger than the socket groove diameter and an inner diameter smaller than the pin groove diameter;

wherein the axial passageway of the socket is adapted to receive the pin to an axial distance where the pin groove and the socket groove are at least partially axially aligned;

wherein at a position of the pin in the axial passageway of the socket where the pin groove and the socket groove are at least partially axially aligned the radial canted coil spring is compressed between the pin groove and the socket groove; and wherein the pin side buckle further comprises a buckle pin and the socket side buckle further comprises a buckle opening, and wherein at an axial position of the pin in the passageway where the pin groove and socket groove are at least partially axially aligned the buckle pin is positioned in the buckle opening.

7. The animal handling device of claim 1 wherein the first side buckle further comprises a buckle pin and second side buckle further comprises a buckle opening, and wherein at an axial position of the pin in the passageway where the pin groove and socket groove are at least partially axially aligned the buckle pin is positioned in the buckle opening.

8. An animal handling device comprising:

a strap having a first section and a second section;

a pin side buckle coupled to a first end of the first section of the strap, the pin side buckle comprising a pin having an outer pin diameter and an annular groove having a pin groove diameter, wherein the outer pin diameter is larger than the pin groove diameter;

a socket side buckle coupled to a first end of the second section of strap, the socket side buckle comprising a socket having an axial passageway of a first socket diameter, the axial passageway having a socket groove of a socket groove diameter, wherein the socket groove diameter is larger than the first socket diameter;

a radial canted coil spring, the radial canted coil spring in an uncompressed state having an outer diameter larger than the socket groove diameter and an inner diameter smaller than the pin groove diameter;

wherein the axial passageway of the socket is adapted to receive the pin to an axial distance where the pin groove and the socket groove are at least partially axially aligned;

wherein at a position of the pin in the axial passageway of the socket where the pin groove and the socket groove are at least partially axially aligned the radial canted coil spring is compressed between the pin groove and the socket groove;

wherein the pin has a nose and a body portion, wherein the diameter of the nose is smaller than the diameter of the body portion, and wherein the pin has a lead-in radius from the nose to the body portion, and wherein the pin further comprises a threaded portion opposite the nose, and wherein the pin side buckle further comprises a fastener adapted to receive the threaded portion of the pin.

9. The animal handling device of claim 1 wherein the first side buckle further comprises a first substrate having a first strap opening and wherein a portion of the first section of the strap is positioned in the first strap opening.

10. The animal handling device of claim 9 wherein the second side buckle further comprises a second substrate having a second strap opening and wherein a portion of the second section of the strap is positioned in the second strap opening.

11. The animal handling device of claim 1 further comprising:

a boot for engaging a body part of an animal;

a handle;

wherein a second end of the first section of the strap is coupled to the boot and a second end of the second section of the strap is coupled to the handle.

12. The animal handling device of claim 1 further comprising:

a boot for engaging a body part of an animal;

a handle;

wherein the first side buckle is coupled to the boot and the second side buckle is coupled to the handle.

13. The animal handling device of claim 1 further comprising:

a boot for engaging a body part of a person or animal;

a handle;

wherein the second side buckle is coupled to the boot and the first side buckle is coupled to the handle.

14. The animal handling device of claim 1 wherein the strap further comprises a lunge line.

15. The animal handling device of claim 1 wherein the strap further comprises a cross-tie.

16. The animal handling device of claim 1 wherein the strap further comprises a leash.

17. The animal handling device of claim 1 wherein the strap further comprises a halter.

18. The animal handling device of claim 1 wherein an edge of the pin groove is chamfered;

wherein an edge of the socket groove has a radius;

wherein the pin has a nose and a body portion, wherein the diameter of the nose is smaller than the diameter of the body portion, and wherein the pin has a lead-in radius from the nose to the body portion; and wherein at a position of the pin in the axial passageway of the socket where the pin groove and the socket groove are at least partially axially aligned an outer portion of the radial canted coil spring is positioned in the socket groove and an inner portion of the radial canted coil spring is positioned in the pin groove.

19. An animal handling device comprising:

a strap having a first section and a second section;

a pin side buckle coupled to a first end of the first section of the strap, the pin side buckle comprising a pin having an outer pin diameter and an annular groove having a pin groove diameter, wherein the outer pin diameter is larger than the pin groove diameter;

a socket side buckle coupled to a first end of the second section of strap, the socket side buckle comprising a socket having an axial passageway of a first socket diameter, the axial passageway having a socket groove of a socket groove diameter, wherein the socket groove diameter is larger than the first socket diameter;

a radial canted coil spring, the radial canted coil spring in an uncompressed state having an outer diameter larger than the socket groove diameter and an inner diameter smaller than the pin groove diameter;

wherein the axial passageway of the socket is adapted to receive the pin to an axial distance where the pin groove and the socket groove are at least partially axially aligned;

wherein at a position of the pin in the axial passageway of the socket where the pin groove and the socket groove are at least partially axially aligned the radial canted coil spring is compressed between the pin groove and the socket groove;

wherein an edge of the pin groove is chamfered;

wherein an edge of the socket groove has a radius;

wherein the pin has a nose and a body portion, wherein the diameter of the nose is smaller than the diameter of the body portion, and wherein the pin has a lead-in radius from the nose to the body portion;

wherein at a position of the pin in the axial passageway of the socket where the pin groove and the socket groove are at least partially axially aligned an outer portion of the radial canted coil spring is positioned in the socket groove and an inner portion of the radial canted coil spring is positioned in the pin groove; and wherein the socket side buckle further comprises a first buckle pin and the pin side buckle further comprises a first buckle opening, and wherein at an axial position of the pin in the passageway where the pin groove and socket groove are at least partially axially aligned the first buckle pin is positioned in the first buckle opening.

20. The animal handling device of claim 19 wherein the pin side buckle further comprises a second buckle pin and the socket side buckle further comprises a second buckle opening, and wherein at an axial position of the pin in the passageway where the pin groove and socket groove are at least partially axially aligned the second buckle pin is positioned in the second buckle opening.

* * * * *